(12) United States Patent
Fujii et al.

(10) Patent No.: US 9,004,993 B2
(45) Date of Patent: Apr. 14, 2015

(54) VEHICULAR SEAT AIR-CONDITIONING SYSTEM

(75) Inventors: Takahisa Fujii, Chiryu (JP); Yasuhiko Niimi, Handa (JP); Yuji Ito, Okazaki (JP); Takeshi Nishiura, Nisshin (JP)

(73) Assignees: Denso Corporation, Kariya (JP); Toyota Boshoku Kabushiki Kaisha, Kariya (JP)

( * ) Notice: Subject to any disclaimer, the term of this patent is extended or adjusted under 35 U.S.C. 154(b) by 348 days.

(21) Appl. No.: 13/065,080

(22) Filed: Mar. 14, 2011

(65) Prior Publication Data
US 2011/0226461 A1    Sep. 22, 2011

(30) Foreign Application Priority Data
Mar. 17, 2010  (JP) .................. 2010-060559

(51) Int. Cl.
*A47C 7/74*     (2006.01)
*B60H 1/00*    (2006.01)
*B60N 2/56*    (2006.01)

(52) U.S. Cl.
CPC .......... *B60N 2/5657* (2013.01); *B60H 1/00285* (2013.01); *B60N 2/5628* (2013.01); *B60N 2/5635* (2013.01); *Y10S 454/907* (2013.01)

(58) Field of Classification Search
USPC .............. 454/120, 121, 907; 297/180.13
See application file for complete search history.

(56) References Cited

U.S. PATENT DOCUMENTS 1,903,037 A * 3/1933  Fraver ........................... 454/120
2,978,972 A * 4/1961  Hake ............................. 454/120
3,127,931 A * 4/1964  Johnson ......................... 165/43
4,118,062 A * 10/1978 Harder et al. ................... 296/63
5,382,075 A * 1/1995  Shih ......................... 297/180.14
5,385,382 A * 1/1995  Single, II et al. ........ 297/180.13

(Continued)

FOREIGN PATENT DOCUMENTS

JP          11-48772        2/1999
JP          2008-168776     7/2008
WO         WO 2008/050985   5/2008

OTHER PUBLICATIONS

Office Action issued Mar. 26, 2013 in corresponding Chinese Application No. 201110064772.8 (with English translation).

(Continued)

*Primary Examiner* — Steven B McAllister
*Assistant Examiner* — Jonathan Cotov
(74) *Attorney, Agent, or Firm* — Harness, Dickey & Pierce, PLC

(57) ABSTRACT

A vehicular seat air-conditioning system comprising a blower (11) which generates blown air, an intake duct (12) which is connected to an intake side of the blower (11), a seat air-conditioning duct (13) which is connected to the in-door air-conditioning unit (21) and in which cool air which was cooled by the in-door air-conditioning unit (21) flows, and a box-shaped part (14) which is formed by a separate member from chassis members forming the cabin space and which is connected to a downstream side end of the seat air-conditioning duct (13). The box-shaped part (14) have side walls (14b) which extend in a vertical direction and a bottom (14c) which closes a space surrounded by the side walls (14b) from the lower side, the top ends of the side walls (14b) form an opening part (14a) which opens facing the upper side in the vertical direction, and an upstream side end of the intake duct (12) is inserted into the inside of the box-shaped part (14) through the opening part (14a).

19 Claims, 9 Drawing Sheets

(56) References Cited

U.S. PATENT DOCUMENTS

| | | | |
|---|---|---|---|
| 5,450,894 A * | 9/1995 | Inoue et al. | 165/43 |
| 5,626,386 A * | 5/1997 | Lush | 297/180.13 |
| 5,921,100 A * | 7/1999 | Yoshinori et al. | 62/244 |
| 6,048,024 A * | 4/2000 | Wallman | 297/180.14 |
| 6,059,018 A * | 5/2000 | Yoshinori et al. | 165/42 |
| 6,062,641 A * | 5/2000 | Suzuki et al. | 297/180.1 |
| 6,079,485 A * | 6/2000 | Esaki et al. | 165/43 |
| 6,105,667 A * | 8/2000 | Yoshinori et al. | 165/202 |
| 6,179,706 B1 * | 1/2001 | Yoshinori et al. | 454/120 |
| 6,478,369 B1 * | 11/2002 | Aoki et al. | 297/180.13 |
| 6,488,213 B2 * | 12/2002 | Ohga et al. | 236/49.3 |
| 6,616,522 B2 * | 9/2003 | Colinet | 454/121 |
| 6,736,452 B2 * | 5/2004 | Aoki et al. | 297/180.13 |
| 6,745,586 B1 * | 6/2004 | Reimann et al. | 62/244 |
| 6,793,016 B2 * | 9/2004 | Aoki et al. | 165/202 |
| 6,848,742 B1 * | 2/2005 | Aoki et al. | 297/180.14 |
| 6,857,955 B1 * | 2/2005 | Held | 454/144 |
| 6,871,696 B2 * | 3/2005 | Aoki et al. | 165/43 |
| 6,926,601 B2 * | 8/2005 | Aoki et al. | 454/121 |
| 6,928,829 B2 * | 8/2005 | Kamiya et al. | 62/244 |
| 7,028,493 B2 * | 4/2006 | Tomita et al. | 62/161 |
| 7,131,689 B2 * | 11/2006 | Brennan et al. | 297/180.14 |
| 7,201,441 B2 * | 4/2007 | Stoewe et al. | 297/180.14 |
| 7,261,372 B2 * | 8/2007 | Aoki | 297/180.14 |
| 7,275,983 B2 * | 10/2007 | Aoki et al. | 454/75 |
| 7,364,229 B2 * | 4/2008 | Lee | 297/180.16 |
| 7,380,587 B2 * | 6/2008 | Naruse et al. | 165/202 |
| 7,578,552 B2 * | 8/2009 | Bajic et al. | 297/184.12 |
| 7,640,754 B2 * | 1/2010 | Wolas | 62/3.61 |
| 7,673,935 B2 * | 3/2010 | Nishide et al. | 297/180.14 |
| 7,905,545 B2 * | 3/2011 | Andersson et al. | 297/217.3 |
| 8,167,368 B2 * | 5/2012 | Eckel | 297/180.14 |
| 8,360,517 B2 * | 1/2013 | Lazanja et al. | 297/180.14 |
| 2001/0004008 A1 * | 6/2001 | Aoki et al. | 165/43 |
| 2001/0045099 A1 * | 11/2001 | Ohga et al. | 62/186 |
| 2002/0164942 A1 * | 11/2002 | Elliot | 454/121 |
| 2004/0107713 A1 * | 6/2004 | Aoki | 62/208 |
| 2004/0139754 A1 * | 7/2004 | Kamiya et al. | 62/186 |
| 2004/0139758 A1 * | 7/2004 | Kamiya et al. | 62/244 |
| 2004/0198212 A1 * | 10/2004 | Aoki et al. | 454/120 |
| 2005/0087325 A1 * | 4/2005 | Roland et al. | 165/42 |
| 2005/0178755 A1 * | 8/2005 | Ulbrich | 219/202 |
| 2005/0268621 A1 * | 12/2005 | Kadle et al. | 62/3.2 |
| 2007/0101729 A1 * | 5/2007 | Aoki et al. | 62/3.61 |
| 2009/0031742 A1 * | 2/2009 | Seo et al. | 62/244 |
| 2009/0117841 A1 * | 5/2009 | Goto et al. | 454/127 |
| 2009/0218855 A1 * | 9/2009 | Wolas | 297/180.14 |
| 2009/0229785 A1 * | 9/2009 | Kadle et al. | 165/42 |
| 2009/0253363 A1 * | 10/2009 | Pudenz | 454/120 |
| 2010/0314071 A1 * | 12/2010 | Lee et al. | 165/59 |
| 2012/0129439 A1 * | 5/2012 | Ota et al. | 454/120 |
| 2012/0267937 A1 * | 10/2012 | Sahashi | 297/452.42 |

OTHER PUBLICATIONS

Office Action dated Jun. 6, 2014 in corresponding CN Application No. 201110064772.8 with English translation.

* cited by examiner

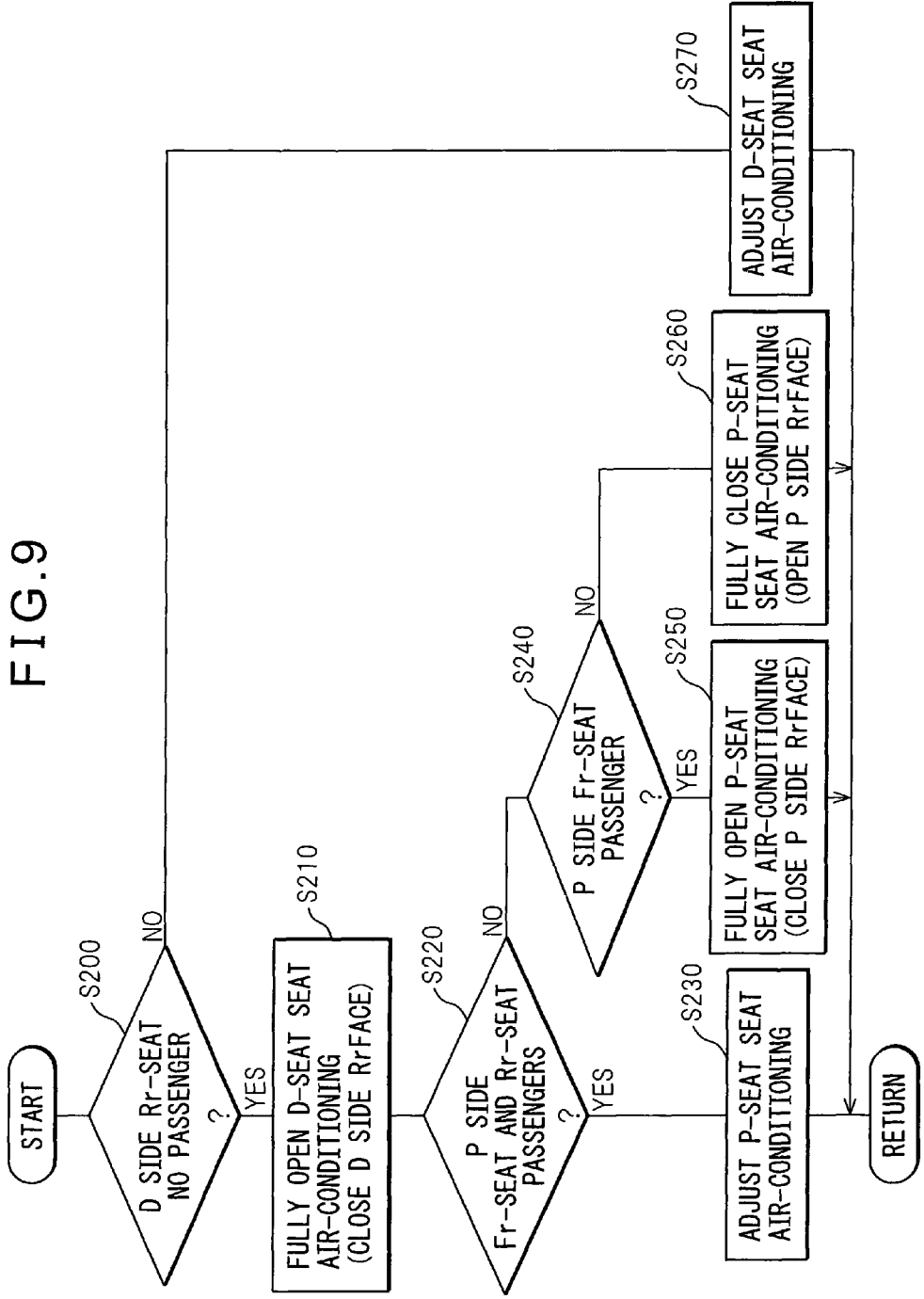

VEHICULAR SEAT AIR-CONDITIONING SYSTEM

BACKGROUND OF THE INVENTION

1. Field of the Invention

The present invention relates to a vehicular seat air-conditioning system which blows air from seats.

2. Description of the Related Art

In the past, this type of vehicular seat air-conditioning system was described in Japanese Patent Publication (A) No. 2008-168776. In this prior art, a blower is attached to a bottom surface of a seat, air blown from the blower flows through an air passage provided inside the seat, and the air is blown from a vent provided at the seat top to the passenger.

In the blower, air-conditioned air (cool air) which is supplied from an in-door air-conditioning unit of a vehicular air-conditioning unit (main air-conditioning system for air-conditioning of the cabin space) is introduced. Due to this, the air-conditioned air (cool air) which is supplied from the in-door air-conditioning unit of the vehicular air-conditioning unit can be sent to the vehicular seat air-conditioning system, so it is possible to quickly make the driver or passenger comfortable.

Further, this prior art is a non-connection type where a floor duct which is connected to the blowing side of the in-door air-conditioning unit of the vehicular air-conditioning unit and a slide duct which is connected to the intake side of the blower of the vehicular seat air-conditioning system are not connected.

The floor duct is arranged along the cabin floor. Its downstream side end forms a vent which blows out air-conditioned air (cool air). The slide duct is fastened to a seat rail used for adjustment of the position of the seat in the longitudinal direction. The upstream side end forms an air collection port for collecting air-conditioned air (cool air) which was blown out from the floor duct.

The vent of the floor duct opens facing the vehicle rear side. The air collection port of the slide duct opens facing the vehicle front side and is arranged separated from the vent of the floor duct at the vehicle rear side. Further, the air collection port of the slide duct is designed to be able to slide in the vehicle longitudinal direction along with the seat when adjusting the position of the seat in the longitudinal direction.

Due to this, it is possible to supply air-conditioned air (cool air) which is supplied from the in-door air-conditioning unit of the vehicular air-conditioning unit to the vehicular seat air-conditioning system, so it is possible to quickly make the driver or passenger comfortable. Further, the floor duct and the slide duct are not connected, so even if adjusting the position of the seat in the longitudinal direction, it is possible to adjust the position of the seat in the longitudinal direction well without interference between the floor duct and slide duct.

However, according to the above prior art, the air collection port of the slide duct is arranged away from the vent of the floor duct, so before the air-conditioned air (cool air) which is blown out from the vent of the floor duct reaches the air collection port of the slide duct, cabin air (warm air) is entrained. For this reason, the air-conditioned air (cool air) which is sucked into the air collection port of the slide duct ends up rising in temperature and the heat loss becomes greater.

Further, if changing the slide position of the vehicular seat in the vehicle longitudinal direction, the distance from the vent of the floor duct to the air collection port of the slide duct ends up changing, so the temperature of the air-conditioned air (cool air) which is supplied to the vehicular seat air-conditioning system ends up varying and the air-conditioning ability of the vehicular seat air-conditioning system ends up fluctuating.

SUMMARY OF THE INVENTION

The present invention, in consideration of the above points, has as its object the decrease of the heat loss and the suppression of variation of the cool air temperature accompanying positional adjustment of a seat.

To achieve the above object, a first aspect of the present invention provides a vehicular seat air-conditioning system which blows out from a seat (1) cool air which is supplied from an in-door air-conditioning unit (21) which air-conditions a cabin space, the vehicular seat air-conditioning system comprising a blower (11) which generates blown air, an intake duct (12) which is connected to an intake side of the blower (11), a seat air-conditioning duct (13) which is connected to the in-door air-conditioning unit (21) and in which cool air which was cooled by the in-door air-conditioning unit (21) flows, and a box-shaped part (14) which is formed by a separate member from chassis members forming the cabin space and which is connected to a downstream side end of the seat air-conditioning duct (13), the box-shaped part (14) having side walls (14b) which extend in a vertical direction and a bottom (14c) which closes a space surrounded by the side walls (14b) from the lower side, the top ends of the side walls (14b) forming an opening part (14a) which opens facing the upper side in the vertical direction, and an upstream side end of the intake duct (12) being inserted into the inside of the box-shaped part (14) through the opening part (14a).

According to this, the upstream side end of the intake duct (12) is inserted inside of the box-shaped part (14) which is connected to the seat air-conditioning duct (13) at its downstream side end, so even if adjusting the position of the seat (1), the intake duct (12) can suck in cool air of a constant temperature. For this reason, the variation in cool air temperature which accompanies adjustment of the position of the seat (1) can be suppressed.

Here, the upstream side end of the intake duct (12) is inserted through the opening part (14a) to the inside of the box-shaped part (14), while the opening part (14a) opens to the upper side in the vertical direction, so it is possible to keep the cabin air, which is warmer and lighter than the cool air, from flowing in from the opening part (14a). For this reason, it is possible to keep cabin air from mixing with the cool air from the in-door air-conditioning unit (21), so it is possible to decrease the heat loss.

According to the first aspect of the present invention, in the vehicular seat air-conditioning system, the box-shaped part (14) may have projections (14d) which project out from the tops of the side walls (14b) toward the inside of the opening part (14a). Due to this, it is possible to further suppress entry of cabin air from the opening part (14a).

According to the first aspect of the present invention, in the vehicular seat air-conditioning system, the seat (1) may be a seat for front seat use, the in-door air-conditioning unit (21) may be arranged at the front most part in the cabin, and the seat air-conditioning duct (13) may be connected to the in-door air-conditioning unit (21) through a rear seat use blowing duct (22) which extends from the in-door air-conditioning unit (21) toward the rear seats.

According to this, it is possible to effectively utilize an existing rear seat use blowing duct (22) to easily install the seat air-conditioning duct (13), so it is possible to easily supply cool air to the seat air-conditioning duct (13).

According to the first aspect of the present invention, in the vehicular seat air-conditioning system, the rear seat use blowing duct (22) may be arranged between a driver's seat and a front passenger's seat, and the box-shaped part (14) may be arranged further toward a center in a vehicle width direction than a centerline (C1) of a seat (1) in the vehicle width direction.

Due to this, it is possible to shorten the overall length of the seat air-conditioning duct (13) and suppress heat loss. Further, the opening part (14a) and side walls (14b) are arranged at positions far from the outside of the vehicle, so the effects of radiant heat can also be suppressed.

According to the first aspect of the present invention, in the vehicular seat air-conditioning system, the intake duct (12) may be fastened to a seat rail (5) used for adjustment of the seat (1) in a longitudinal direction position.

According to this, it is possible to employ the vehicle assembly process of assembling the seat rails (5), blower (11), and intake duct (12) with a seat (1), assembling the seat air-conditioning duct (13) at the chassis side, then assembling the seat (1) at the chassis side and inserting the downstream side end of the intake duct (12) in the opening part (14a) of the seat air-conditioning duct (13). For this reason, it is possible to facilitate the work of mounting the assembly at the vehicle.

According to the first aspect of the present invention, the vehicular seat air-conditioning system may be further comprising a temperature detecting means (17) for detecting a temperature of cool air at least at one of the seat air-conditioning duct (13) and the intake duct (12) and a controlling means (16) for controlling at least one of the blower (11) in blower level and the seat air-conditioning duct (13) in air flow rate based on detection results of the temperature detecting means (17). Due to this, it becomes possible to prevent the driver or passenger from being overly cooled and to improve comfort.

According to a first aspect of the present invention, the vehicular seat air-conditioning system may be further comprising an adjustment mechanism (18) which adjusts the seat air-conditioning duct (13) in air flow rate.

Due to this, it is possible to adjust the vented cool air temperature while leaving the blower level of the blower (11) constant, so it becomes possible to maintain the feeling of the flow of air to the driver or passenger while preventing the driver or passenger from becoming overly cold and thereby improve the comfort.

According to the first aspect of the present invention, the vehicular seat air-conditioning system may be further comprising an opening/closing mechanism (18) which opens and closes the seat air-conditioning duct (13) and the rear seat use blowing duct (22), a sitting detecting means (19) for detecting passengers sitting at the rear seats, and a controlling means (16) for controlling the opening/closing mechanism (18) based on detection results of the sitting detecting means (19). The controlling means (16) may control the opening/closing mechanism (18) so that the seat air-conditioning duct (13) is opened and the rear seat use blowing duct (22) is closed when the sitting detecting means (19) detects there are no passengers at the rear seats.

According to this, when the rear seats have no passengers, it is possible to stop blowing cool air to the rear seat side and supply all of the cool air flowing through the rear seat use blowing duct (22) to the front seat side. For this reason, it is possible to improve the comfort of a front seat.

A second aspect of the present invention provides a vehicular seat air-conditioning system which blows out from a seat (1) cool air which is supplied from an in-door air-conditioning unit (21) which air-conditions a cabin space, the vehicular seat air-conditioning system comprising a blower (11) which generates blown air, an intake duct (12) which is connected to an intake side of the blower (11), and a seat air-conditioning duct (13) which is connected to the in-door air-conditioning unit (21) and in which cool air which was cooled by the in-door air-conditioning unit (21) flows, a downstream side end of the seat air-conditioning duct (13 being formed with a box-shaped part (14) in which cool air from the in-door air-conditioning unit (21) is filled, the box-shaped part (14) being formed with an opening part (14a) which opens facing the upper side in the vertical direction, an upstream side end of the intake duct (12) being inserted into the inside of the box-shaped part (14) through the opening part (14a), and the blower (11) sucking in and blowing out cool air which filled the box-shaped part (14) through the intake duct (12).

Due to this, it is possible to obtain actions and effects similar to the vehicular seat air-conditioning system of the above first aspect of the present invention.

Note that the reference numerals in parentheses after the means described in this section and in the claims show the correspondence with the specific means described in the later embodiments.

BRIEF DESCRIPTION OF THE DRAWINGS

The present invention may be more fully understood from the description of preferred embodiments of the invention, as set forth below, together with the accompanying drawings, wherein

FIG. 9 is a flowchart showing control processing of the vehicular seat air-conditioning system according to the seventh embodiment.

DESCRIPTION OF THE PREFERRED EMBODIMENTS

First Embodiment

Below, a first embodiment of the present invention will be explained with reference to FIG. 1A, FIG. 1B, and FIG. 1C. The present embodiment applies vehicular seat air-conditioning systems of the present invention to the front seats (driver's seat and front passenger's seat).

Figure 1A:
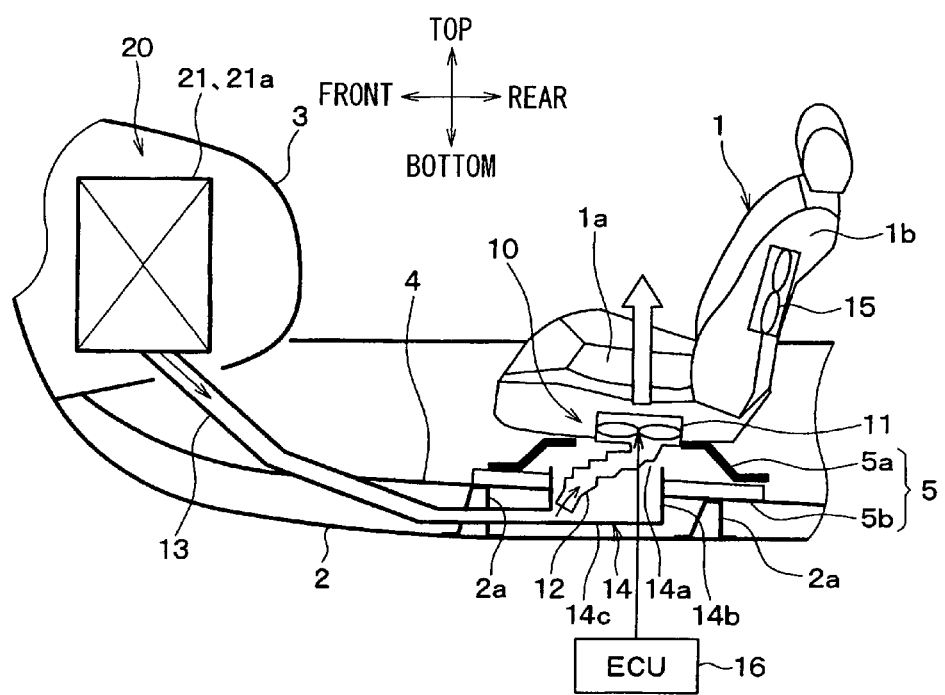
FIG. 1A to FIG. 1C are views showing a vehicular seat air-conditioning system according to a first embodiment of the present invention.
Figure 1B:
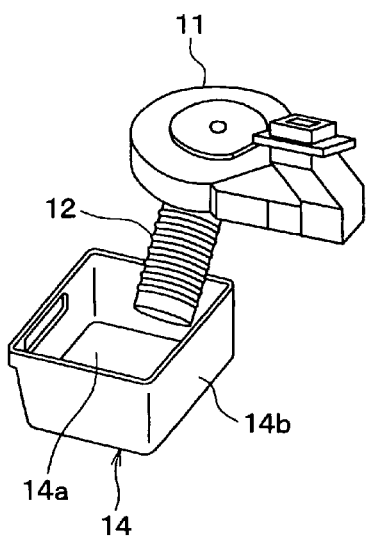

FIG. 1A shows the general configuration of a vehicular seat air-conditioning system according to the present embodiment. The four arrows in FIG. 1A show vertical and horizontal directions of the vehicle.

Each vehicular seat air-conditioning system 10 is configured to blow cool air which is supplied from a vehicular air-conditioning unit 20 for air-conditioning a cabin space from the surface of a seat 1 for front seat use.

A blower 11 of each vehicular seat air-conditioning system 10 is built into a seat top 1*a* of the seat 1. The air blown from the blower 11 passes through an air passage (not shown) which is formed inside of the seat top 1*a* (cushion material) and an air vent opening (not shown) which is formed in the surface (surface covering) of the seat top 1*a* and is blown out from the surface of the seat top 1*a*.

Each blower 11 has a blowing fan which generates blown air, a motor which drives rotation of the blowing fan, and a casing which houses the blowing fan. At an air intake port of the casing (intake air of blower 11), an intake duct 12 is connected. The intake duct 12 hangs down toward a cabin floor surface 2.

Each intake duct 12 sucks in cool air which is supplied from the vehicular air-conditioning unit 20 from the bottom end. The vehicular air-conditioning unit 20 is provided with an in-door air-conditioning unit 21. The in-door air-conditioning unit 21 is arranged at the inside of an instrument panel 3 at the front most part of the cabin interior.

The in-door air-conditioning unit 21 houses, inside an air-conditioning case 21*a*, a blower, refrigeration cycle evaporator (cooling-use heat exchanger) and heater core (heating-use heat exchanger) and other various air-conditioning devices. The air-conditioned air which was adjusted by the in-door air-conditioning unit 21 to the desired temperature is blown out from ducts and vents which are connected to the air-conditioning case 21*a* (both not shown) into the cabin.

As the ducts, face ducts, foot ducts, and defroster ducts are provided, while as the vents, face vents, foot vents, and defroster vents are provided.

The face vents are arranged above the instrument panel 3 and mainly blow cool air toward the heads of the driver and passenger to give the driver and passenger a cool feeling. The foot vents are arranged below the instrument panel 3 and mainly blow warm air toward the feet of the driver and passenger to give the driver and passenger a warm feeling. The defroster vents are arranged at the top surface of the instrument panel 3 and blow air-conditioned air toward the vehicle front window glass to prevent fogging of the vehicle front window glass.

Furthermore, at a downstream side of the air-conditioning case 21*a*, a seat air-conditioning duct 13 of each vehicular seat air-conditioning system 10 is connected. The seat air-conditioning duct 13 plays the role of supplying cool air cooled by the in-door air-conditioning unit 21 to the intake duct 12.

Each seat air-conditioning duct 13 hangs down from the air-conditioning case 21*a* toward the cabin floor surface 2, then extends along the cabin floor surface 2 toward the cabin rear side. More specifically, the part of the seat air-conditioning duct 13 which extends along the cabin floor surface 2 is arranged between the cabin floor surface 2 and a carpet 4.

At the downstream side end (vent) of each seat air-conditioning duct 13, a box-shaped part 14 in which cool air from the in-door air-conditioning unit 21 is filled is formed. The box-shaped part 14 is formed by a separate member from the chassis members forming the cabin space and is connected to the seat air-conditioning duct 13 at its downstream side end.

Each box-shaped part 14 has an opening part 14*a* which opens facing the upper side in the vertical direction. Specifically, the box-shaped part 14 has side walls 14*b* extending in the vertical direction and a bottom 14*c* closing the space formed by the side walls 14*b* from the lower side. The top ends of the side walls 14*b* form the opening part 14*a*.

The side walls 14*b* perform the role of separating the cool air from the in-door air-conditioning unit 21 from the cabin air. The side walls 14*b* are shaped so that operation of the vehicle doors will not result in cabin air mixing with the cool air from the in-door air-conditioning unit 21.

The opening part 14*a* of each box-shaped part 14 is exposed to the inside of the cabin through holes formed in the carpet 4. As shown in FIG. 1B, inside the box-shaped part 14, the bottom end (intake port) of an intake duct 12 is inserted through the opening part 14*a*.

Due to this, the blower 11 of each vehicular seat air-conditioning system 10 sucks in the cool air which was filled in the box-shaped part 14 of the seat air-conditioning duct 13 through the intake duct 12 and blows it out toward the surface of the seat top 1*a* of a seat 1.

Each seat 1 is fastened through seat rails 5 to the cabin floor surface 2. The seat rails 5 are for adjusting the seating position of the seat 1 and include upper rails 5*a* and lower rails 5*b*. The upper rails 5*a* are fastened to the back surface (bottom surface) of the seat top 1*a*. The lower rails 5*b* are fastened to brackets 2*a* provided at the cabin floor surface 2. The upper rails 5*a* are designed to be able to slide with respect to the lower rails 5*b* in the longitudinal direction. Due to this, it is possible to adjust the longitudinal direction position of the seat 1.

Figure 1C:
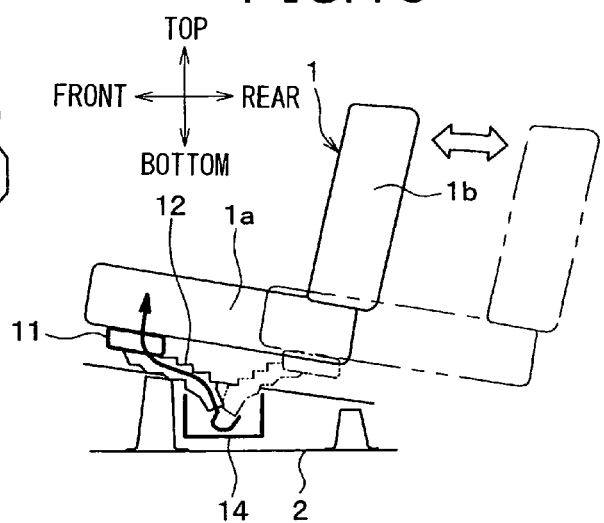

As shown in FIG. 1C, in the range of adjustment of each seat 1 in longitudinal direction position by the seat rails 5, the bottom end (intake port) of the intake duct 12 is maintained in a state inserted into the box-shaped part 14. Specifically, the box-shaped part 14 has a certain extent of size and the intake duct 12 is formed in a flexible bellows shape capable of changing length and shape, so even if adjusting the position of a seat 1 in the longitudinal direction, the inserted state of the intake duct 12 in the box-shaped part 14 is maintained.

In the present embodiment, each seat 1 is designed to be able to be adjusted in up/down direction position by a not shown vertical adjuster mechanism. Further, the back 1*b* of the seat 1 also has a blower 15 built into it for blowing blown air from the surface of the seat back 1*b*.

The blowers 11 and 15 are controlled by controlling means comprised of a control device (ECU) 16. The control device 16 is comprised of a CPU, ROM, RAM, I/O, etc. provided in a known microcomputer and runs processing such as various types of calculations in accordance with a program stored in the ROM etc.

The control device 16 receives as input operation signals from blower operation switches (not shown) which are provided at an air-conditioner operation panel (not shown). The blower operation switches may be used to turn the blowers 11 and 15 on and off and set the blower levels of the blowers 11 and 15. As the blower levels of the blowers 11 and 15, for example, a low air flow (Lo), middle air flow (Mid), and high air flow (Hi) may be set.

Note that, the air-conditioner operation panel is also provided with various types of operation switches for the vehicular air-conditioning unit 20.

Next, the operation in the above constitution will be explained. Here, the operation at the time of cooling in the summer will be explained. If the air-conditioner operation panel is operated so as to actuate a vehicular seat air-conditioning system 10 and the vehicular air-conditioning unit 20, cool air air-conditioned at the in-door air-conditioning unit 21 flows through the corresponding seat air-conditioning duct 13 and fills a corresponding box-shaped part 14.

The cool air which fills the box-shaped part 14 is sucked from the intake duct 12 and blown toward the surface of the seat top 1a by operation of the blower 11 of the vehicular seat air-conditioning system 10 and, furthermore, is blown out from the surface of the seat top 1a to the backside and thighs of the driver or passenger. Due to this, it is possible to suppress dampness and stickiness due to sweat at the backside and thighs of the driver or passenger and possible to improve comfort.

Here, as a comparative example, if considering the case of connecting the seat air-conditioning duct 13 and intake duct 12, in this comparative example, if using the seat rails 5 and a vertical adjuster mechanism to adjust the position of a seat 1, the two ducts 12 and 13 are liable to end up separating, so to prevent separation of the two ducts 12 and 13, it is necessary to increase the extra lengths of the two ducts 12 and 13.

As opposed to this, in the present embodiment, each intake duct 12 is not connected to the seat air-conditioning duct 13, but the intake duct 12 is inserted into the seat air-conditioning duct 13, so the degree of freedom of movement of each intake duct 12 with respect to the seat air-conditioning duct 13 becomes greater.

For this reason, even if making the extra lengths of the ducts 12 and 13 smaller, it is possible to maintain the inserted state of the two ducts 12 and 13 while dealing with the positional adjustment of a seat 1, so it is possible to shorten the two ducts 12 and 13. Further, the intake duct 12 need only be inserted into the seat air-conditioning duct 13, so the configuration of the two ducts 12 and 13 can be streamlined.

Further, in the present embodiment, at the insertion part of the two ducts 12 and 13, since cool air is filled in the box-shaped part 14, even if the two ducts 12 and 13 are just inserted into each without being connected, it is possible to keep cabin air from entering from the insertion part of the two ducts 12 and 13.

That is, at the insertion part of the two ducts 12 and 13, the box-shaped part 14 opens at the upper side, but the cabin air is warmer and lighter than the cool air which fills the box-shaped part 14, so by filling the box-shaped part 14 with cool air, it is possible to suppress the entry of cabin air from the insertion part of the two ducts 12 and 13. Therefore, it is possible to decrease the heat loss due to entry of cabin air, so the air-conditioning ability of each vehicular seat air-conditioning system 10 is improved.

Furthermore, in the range of positional adjustment of each seat 1, the intake duct 12 is maintained in a state inserted in the box-shaped part 14 which is filled with cool air, so even if adjusting the position of the seat 1, it is possible to suck in the constant temperature cool air and in turn possible to blow out constant temperature cool air to the surface of the seat 1. For this reason, it is possible to suppress fluctuation of the vented air temperature along with positional adjustment of the seat 1.

Second Embodiment

Figure 2A:
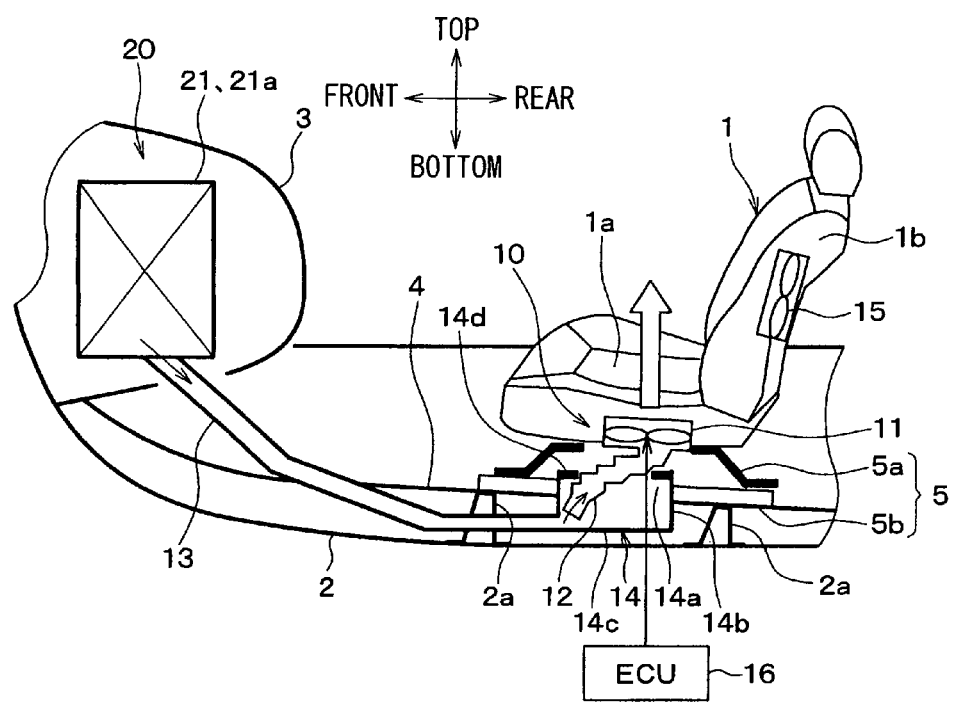
FIG. 2A and FIG. 2B are views showing a vehicular seat air-conditioning system according to a second embodiment of the present invention.
Figure 2B:
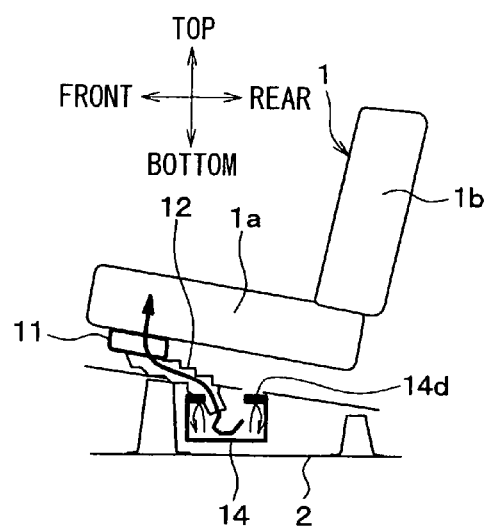

In the present second embodiment, as shown in FIG. 2A and FIG. 2B, the box-shaped part 14 in the first embodiment is formed with overhanging projections 14d which project out from the tops of the side walls 14b toward the inside of the opening part 14a. In the example of FIG. 2A and FIG. 2B, the projections 14d are formed at the top ends of the side walls 14b over the entire circumference of the opening part 14a.

Due to this, it is possible to facilitate the buildup of cool air at each box-shaped part 14 and keep cabin air from entering the box-shaped part 14 better and in turn is possible to further improve the air-conditioning ability of each vehicular seat air-conditioning system 10.

Third Embodiment

Figure 3A:
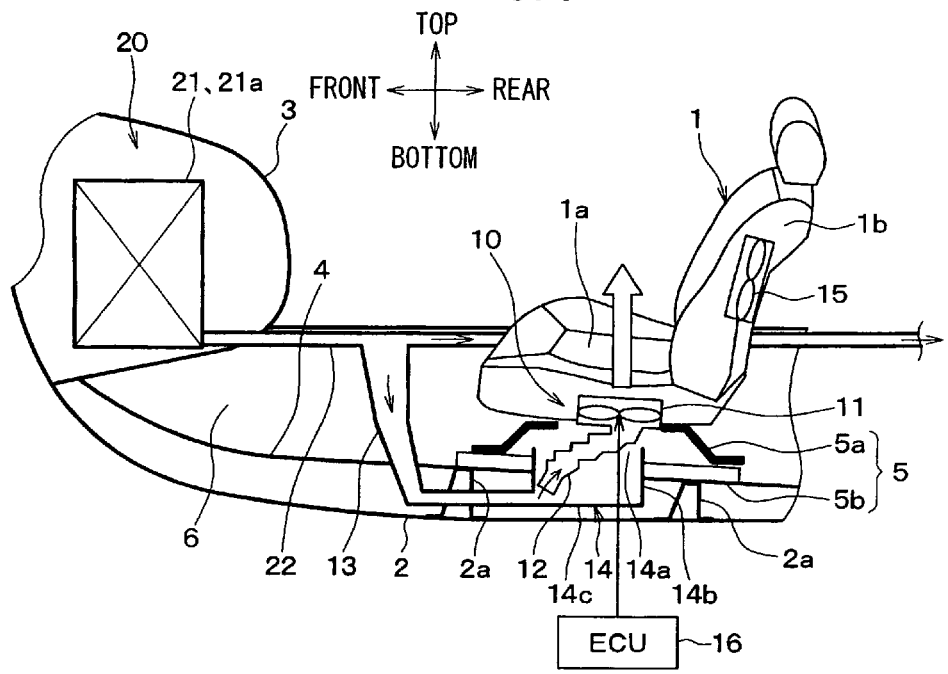
FIG. 3A and FIG. 3B are views showing a vehicular seat air-conditioning system according to a third embodiment of the present invention.

In the first embodiment, each seat air-conditioning duct 13 is directly connected to the air-conditioning case 21a, but in the present third embodiment, as shown in FIG. 3A, each seat air-conditioning duct 13 is connected to the air-conditioning case 21a through a rear face duct 22 forming the rear seat use blowing duct of the vehicular air-conditioning unit 20.

The rear face duct 22 extends from the air-conditioning case 21a toward the vehicle rear side. Specifically, the rear face duct 22 is arranged along a console 6 provided between the driver's seat and front passenger's seat between the driver's seat and front passenger's seat.

At the rear end of the rear face duct 22 (downstream side end), a rear face vent (not shown) is provided. The rear face vent mainly blows cool air toward the heads of the passengers at the rear seats. Note that, two sets of the rear face duct 22 and rear face vent are provided corresponding to the seat behind the driver's seat and the seat behind the front passenger's seat.

The upstream side end of each seat air-conditioning duct 13 is connected to the middle part of the rear face duct 22. Therefore, the cool air which flows in from the in-door air-conditioning unit 21 to the rear face duct 22 is branched to the rear face vent side and the seat air-conditioning duct 13 side. The cool air which flows in to the seat air-conditioning duct 13 fills the box-shaped part 14.

Further, in the same way as the first embodiment, the cool air which fills each box-shaped part 14 is sucked in from the intake duct 12 due to operation of the blower 11 of the vehicular seat air-conditioning system 10, is blown toward the surfaces of the seat top 1a, and furthermore is blown out from the surface of the seat top 1a to the backside and thighs of the driver or passenger.

According to the present embodiment, it is possible to effectively utilize the existing rear face duct 22 which is provided near the seats 1 so as to facilitate installation of each seat air-conditioning duct 13. For this reason, it is possible to easily supply cool air to each vehicular seat air-conditioning system 10.

Figure 3B:
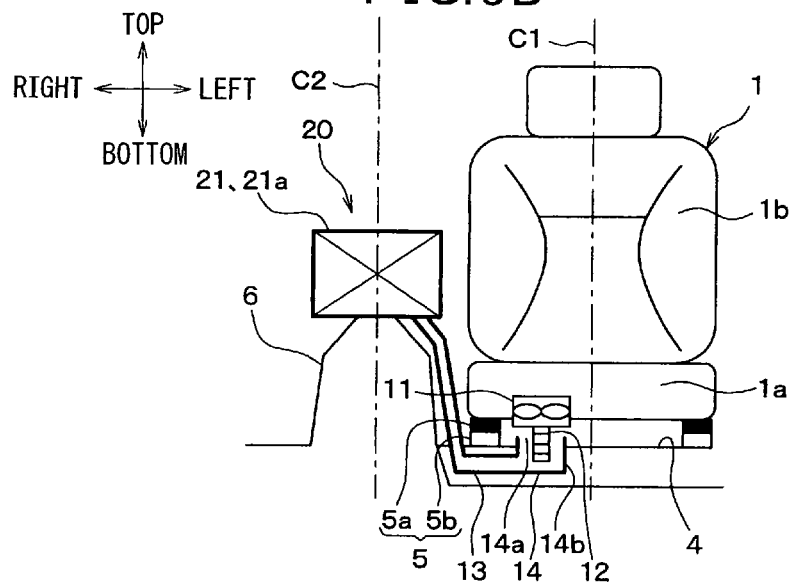

Furthermore, in the present embodiment, each blower 11, intake duct 12, and box-shaped part 14 of a seat air-conditioning duct 13 are arranged closer to the center in the vehicle width direction (closer to the console 6) than the centerline C1 of each seat 1 in the vehicle width direction. Note that, the one-dot chain line C2 of FIG. 3B shows the center line of the vehicle as a whole in the width direction.

Due to this, each blower 11, intake duct 12, and box-shaped part 14 of a seat air-conditioning duct 13 are arranged near the rear face duct 22, so the seat air-conditioning duct 13 is easy to lay and the overall length of the seat air-conditioning duct 13 can be shortened and the heat loss suppressed.

Furthermore, the box-shaped part 14 of each seat air-conditioning duct 13 is arranged at a position far from the outside of the vehicle (door side), so it is possible to suppress the effects of radiant heat and in turn possible to improve the air-conditioning ability.

Fourth Embodiment

Figure 4A:
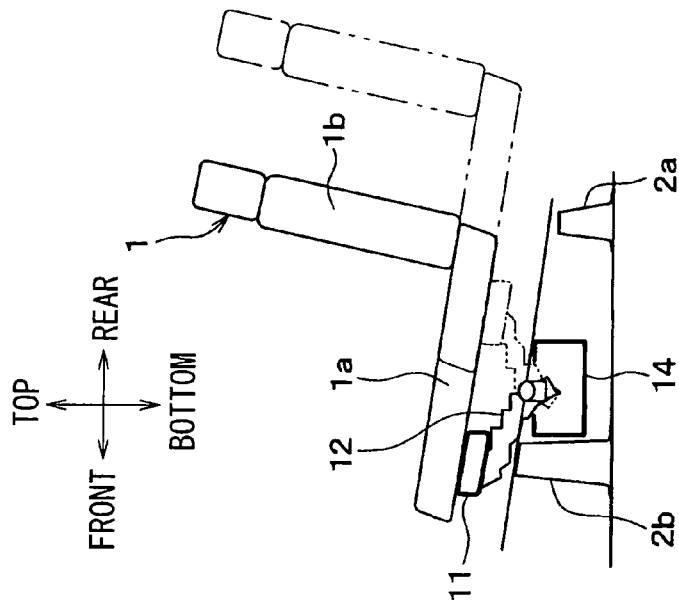
FIG. 4A and FIG. 4B are views showing a vehicular seat air-conditioning system according to a fourth embodiment of the present invention.
Figure 4B:
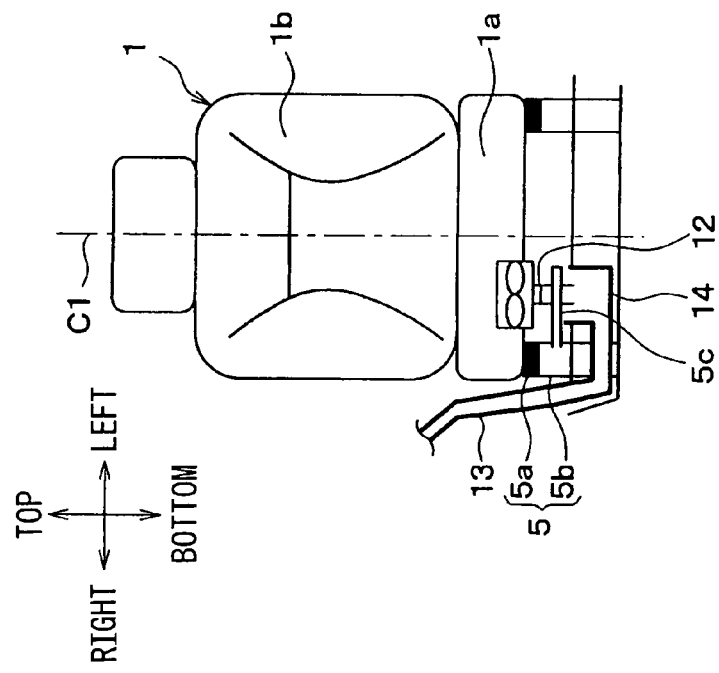

In the present fourth embodiment, as shown in FIG. 4A and FIG. 4B, each intake duct 12 in the first embodiment is fastened to a lower rail 5*b*. Specifically, a predetermined part of the intake duct 12 is fastened to a bracket 5*c* which is provided at the lower rail 5*b*.

Here, the procedure for mounting each vehicular seat air-conditioning system 10 in a vehicle will be explained. First, a blower 11 and intake duct 12 are assembled into a seat 1 to which the upper rails 5*a* and lower rails 5*b* have been assembled in advance. At this time, the intake duct 12 is fastened to a lower rail 5*b* (specifically, a bracket 5*c*).

On the other hand, each seat air-conditioning duct 13 is assembled on to the cabin floor surface 2. Further, the seat 1 is assembled on to the cabin floor surface 2. Specifically, the lower rails 5*b* which have been assembled on to the seat 1 are assembled into brackets 2*a* which are provided on the cabin floor surface. At this time, the bottom end of the intake duct 12 (intake port) is inserted into the opening part 14*a* of the box-shaped part 14 of the seat air-conditioning duct 13.

In this way, according to the present embodiment, the intake duct 12 is fastened to a lower rail 5*b*, so the work of mounting the vehicular seat air-conditioning system 10 at a vehicle can be facilitated.

Fifth Embodiment

In the present fifth embodiment, the blower level of each blower 11 in the first embodiment is controlled based on the temperature of the cool air which is sucked into the intake duct 12.

Figure 5:
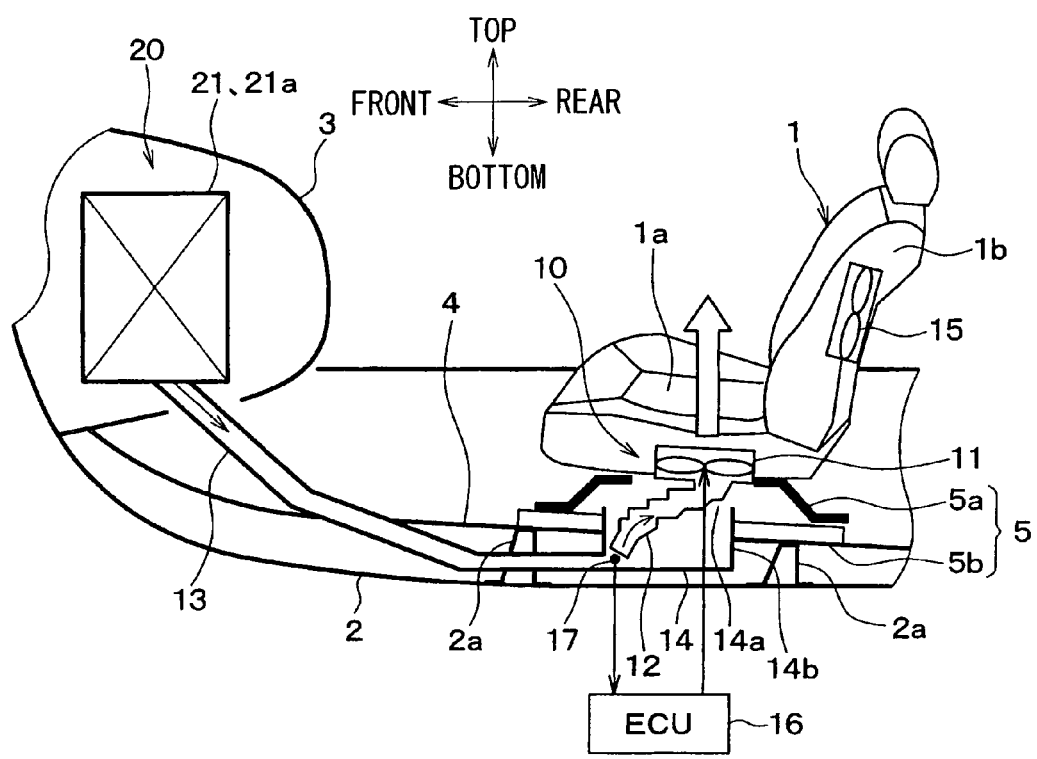
FIG. 5 is a showing a vehicular seat air-conditioning system according to a fifth embodiment of the present invention.

Specifically, as shown in FIG. 5, a temperature sensor (temperature detecting means) 17 for detecting the temperature of the cool air which filled the box-shaped part 14 of the seat air-conditioning duct 13 is arranged in each box-shaped part 14. Based on the temperature of the cool air which the temperature sensor 17 detects, the control device 16 determines the blower level of the blower 11.

Note that, the position of arrangement of the temperature sensor 17 is not limited to the inside of a box-shaped part 14. It may be made any position in the cool air passage from the in-door air-conditioning unit 21 to the surface of the seat top 1*a* of a seat 1.

Figure 6:
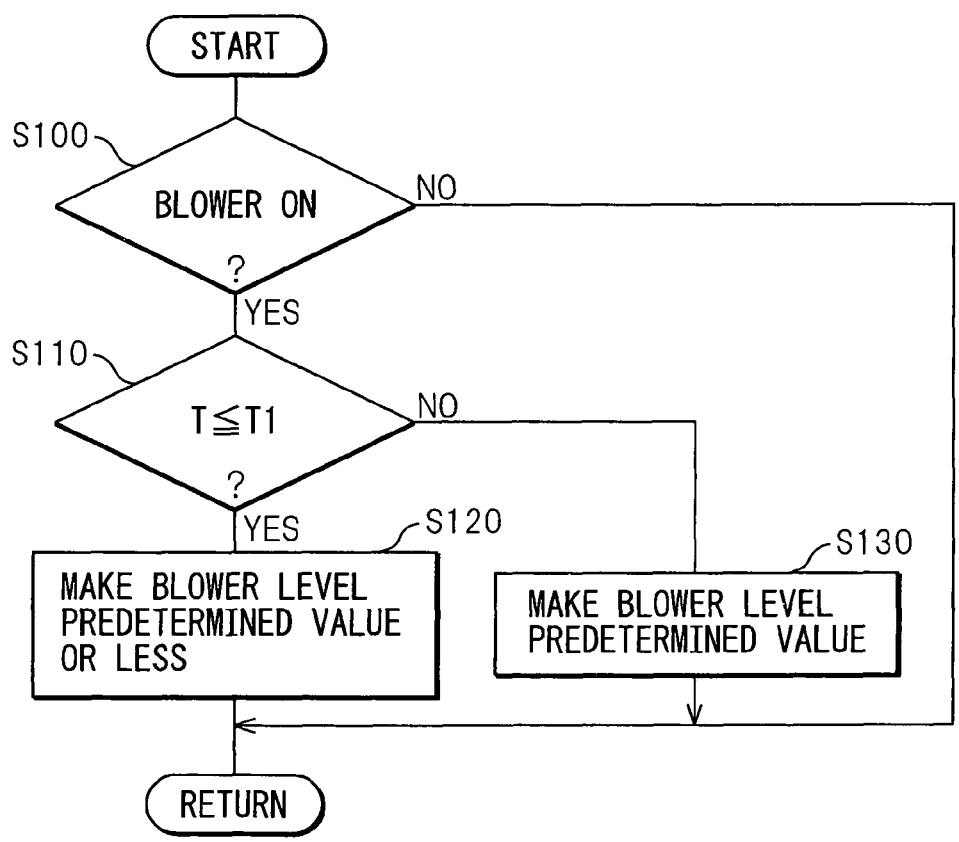
FIG. 6 is a flowchart showing control processing of the vehicular seat air-conditioning system according to the fifth embodiment.

FIG. 6 is a flowchart showing principal parts of the control processing which the control device 16 executes. First, at step S100, it is determined if the blower 11 operation is on. Specifically, the operation states of the blower operation switches of the air-conditioner operation panel are determined.

When it is determined at step S100 that the blower 11 operation is on (case of YES determination), the routine proceeds to step S110 where it is determined if the detection temperature T of the temperature sensor 17 is a predetermined threshold T1 or less.

When it is determined at step S110 that the detection temperature T of the temperature sensor 17 is a predetermined threshold T1 or less (case of YES determination), the routine proceeds to step S120 where the blower level of the blower 11 is made a predetermined value or less. Specifically, the blower level of the blower 11 is made smaller than a blower level which is set by a blower operation switch of the air-conditioner operation panel.

When it is determined at step S110 that the detection temperature T of the temperature sensor 17 is not the predetermined threshold T1 or less (case of NO determination), the routine proceeds to step S130 where the blower level of the blower 11 is made a predetermined value. Specifically, the blower level of the blower 11 is made the same as the blower level which is set by a blower operation switch.

According to the present embodiment, when the temperature of the cool air which the intake duct 12 sucks in is below a constant temperature, the blower level of each blower 11 is kept down and in turn the amount of cool air which is blown out from the surface of a seat top 1*a* to the backside and thighs of the driver or passenger is suppressed. For this reason, it is possible to prevent the driver or passenger from being overly, so it is possible to further improve the comfort of the driver or passenger.

Sixth Embodiment

In the fifth embodiment, when the temperature of the cool air which was sucked into the intake duct 12 is below a certain constant temperature, the blower level of the blower 11 is suppressed, but in the present sixth embodiment, an adjustment mechanism 18 is provided for adjusting the air flow rate of each seat air-conditioning duct 13. When the temperature of the cool air which is sucked into the intake duct 12 is below a certain constant temperature, the adjustment mechanism 18 is used to keep down the air flow rate of the intake duct 12.

Figure 7:
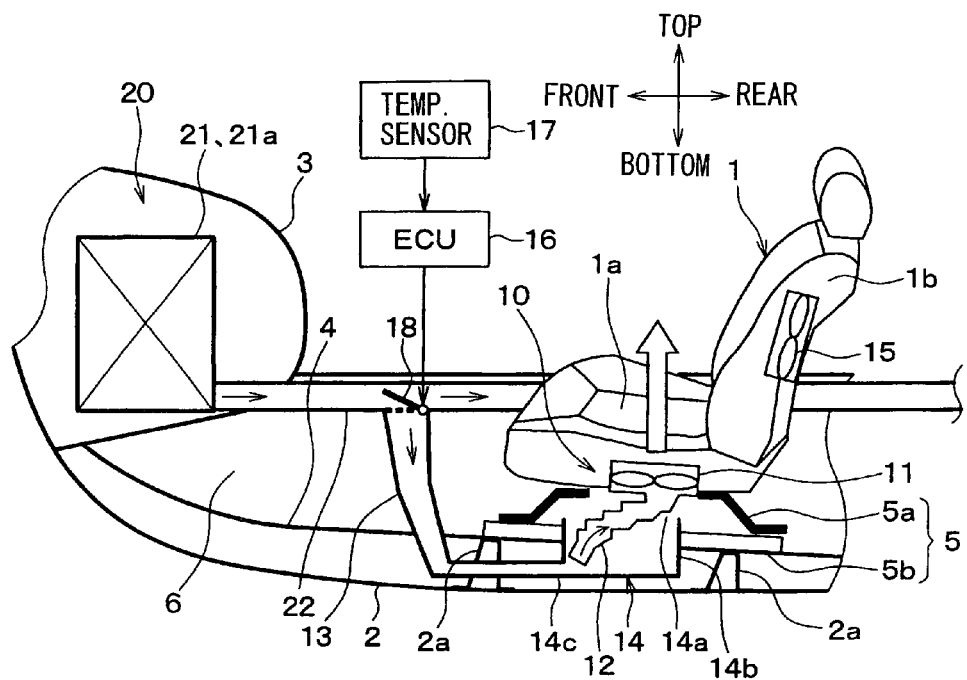
FIG. 7 is a view showing a vehicular seat air-conditioning system according to a sixth embodiment of the present invention.

As shown in FIG. 7, in the present embodiment, in the same way as the third embodiment, each seat air-conditioning duct 13 is connected through a rear face duct 22 to the air-conditioning case 21*a*. Further, the adjustment mechanism 18 is arranged at the inlet part of the seat air-conditioning duct 13 (part branched from rear face duct 22).

In the present embodiment, each adjustment mechanism 18 is comprised of a door (opening/closing mechanism) which opens and closes the seat air-conditioning duct 13 and rear face duct 22. An actuator (not shown) for driving the door 18 is controlled by the control device 16.

The control device 16 controls the position of the door 18 so that the lower the detection temperature T of the temperature sensor 17, the smaller the opening degree of the seat air-conditioning duct 13.

According to the present embodiment, if the temperature of the cool air which fills the box-shaped part 14 of each seat air-conditioning duct 13 becomes low and the temperature of the cool air which the intake duct 12 sucks in becomes low, the opening degree of the seat air-conditioning duct 13 becomes smaller.

For this reason, the air flow rate of the seat air-conditioning duct 13 is decreased and the temperature of the cool air which fills the box-shaped part 14 of each seat air-conditioning duct 13 rises, so the temperature of the cool air which the intake duct 12 sucks in also rises. As a result, the temperature of the cool air which is blown out from the surface of the seat top 1*a* to the backside and thighs of a driver or passenger can be prevented from becoming too low, so it is possible to prevent overcooling of the driver or passenger.

Incidentally, in the present embodiment, unlike the fifth embodiment, even if the detection temperature T of the temperature sensor 17 becomes low, the blower level of each blower 11 is made the same as the blower level set by the blower operation switch. For this reason, the flow of cool air which is blown out from the surface of a seat top 1*a* to the backside and thighs of a driver or passenger is maintained, so the feeling of a flow of air to the driver or passenger can also be maintained.

Seventh Embodiment

In the present seventh embodiment, in addition to the sixth embodiment, a sitting sensor (sitting detecting means) 19 is provided for detecting if passengers are sitting in the seats in the cabin other than the driver's seat. The air flow rate of the intake duct 12 is controlled based on the results of detection by the sitting sensor 19.

Figure 8:
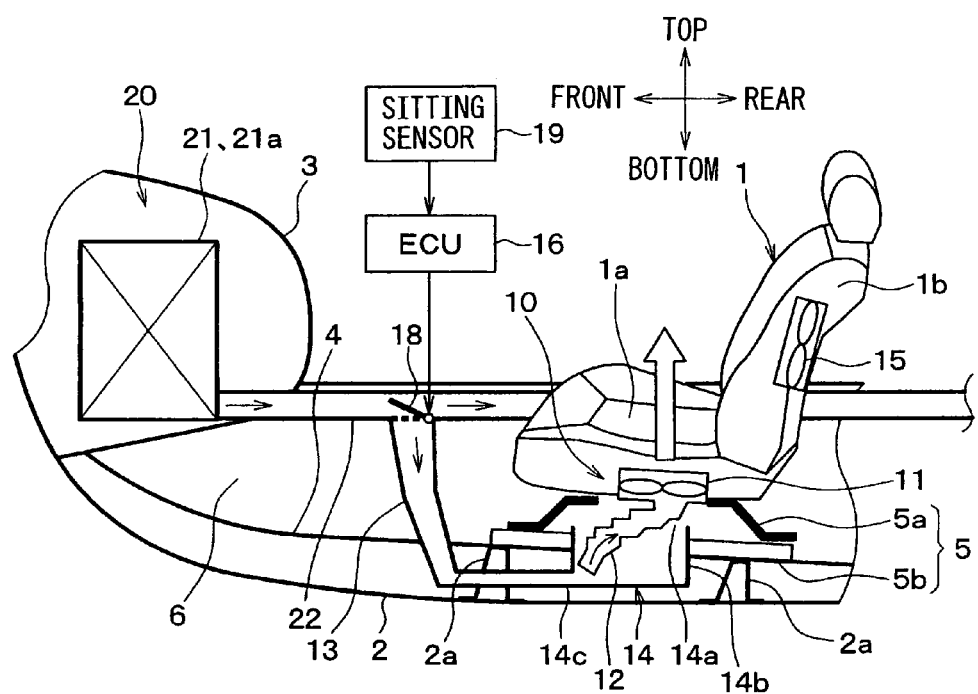
FIG. 8 is a view showing a vehicular seat air-conditioning system according to a seventh embodiment of the present invention.

The sitting sensor 19 shown in FIG. 8 is designed to be able to detecting passengers sitting in the front passenger's seat, the rear seat at the driver's seat side (D side Rr-seat), and the rear seat at the front passenger's seat side (P side Rr-seat). As the sitting sensor 19, it is possible to use a pressure sensor, an infrared sensor, etc. The detection signal of the sitting sensor 19 is input to the control device 16.

In the present embodiment, the vehicular seat air-conditioning system 10 is designed to blow cool air from both the driver's seat (D side Fr-seat) and front passenger's seat (P side Fr-seat). Therefore, the seat air-conditioning duct 13, rear face duct 22, and door 18 are respectively provided for the driver's seat side and front passenger's seat side. The control device 16 controls both of the door 18 at the driver's seat side and the door 18 of the front passenger's seat side.

FIG. 9 is a flowchart showing principal parts in the control processing which the control device 16 executes. First, at step S200, it is determined if the driver's seat side rear seat (D side Rr-seat) has a passenger. When it is determined that the driver's seat side rear seat (D side Rr-seat) has no passenger (case of YES determination), the routine proceeds to step S210 where the door 18 of the driver's seat side is used to fully open up the driver's seat side seat air-conditioning duct 13 (fully open to air-condition D-seat) and to close the driver's seat side rear face duct 22 (close D side Rr FACE). Due to this, cool air is blown from the driver's seat, while cool air is not blown from the driver's seat side rear face vent.

Next, the routine proceeds to step S220 where it is determined if the front passenger's seat and front passenger's seat side rear seat (P side Fr-seat and Rr-seat) have passengers. When it is determined that the front passenger's seat and front passenger's seat side rear seat (P side Fr-seat and Rr-seat) have passengers (case of YES determination), the routine proceeds to step S230 where the front passenger's seat side door 18 is used to control the opening degree of the front passenger's seat side seat air-conditioning duct 13 in the same way as the sixth embodiment (adjust P-seat seat air-conditioning). Due to this, cool air is blown from the front passenger's seat, while cool air is blown from the front passenger's seat side rear face vent.

On the other hand, when it is not determined at step S220 that the front passenger's seat and front passenger's seat side rear seat (P side Fr-seat and Rr-seat) have passengers (NO determination), the routine proceeds to step S240 where it is determined if the front passenger's seat (P side Fr-seat) has a passenger. When it is determined that the front passenger's seat (P side Fr-seat) has a passenger (YES determination), since the front passenger's seat has a passenger while the front passenger's seat side rear seat does not have a passenger, the routine proceeds to step S250 where the front passenger's seat side door 18 is used to fully open the front passenger's seat side seat air-conditioning duct 13 (fully open P-seat seat air-conditioning) and close the front passenger's seat side rear face duct 22 (close P side Rr FACE). Due to this, cool air is blown from the front passenger's seat, while cool air is not blown from the front passenger's seat side rear face vent.

On the other hand, when it is not determined at step S240 that the front passenger's seat (P side Fr-seat) has a passenger (NO determination), since the front passenger's seat has no passenger while the front passenger's seat side rear seat has a passenger, the routine proceeds to step S260 where the front passenger's seat side door 18 is used to fully close the front passenger's seat side seat air-conditioning duct 13 (fully closed P-seat seat air-conditioning) and open the front passenger's seat side rear face duct 22 (close P side Rr FACE).

Due to this, cool air is not blown from the front passenger's seat, while cool air is blown from the front passenger's seat side rear face vent.

On the other hand, when it is not determined step S200 that the driver's seat side rear seat (D side Rr-seat) has a passenger (NO determination), the driver's seat and driver's seat side rear seat have a driver and passenger, so the routine proceeds to step S270 where the driver's seat side door 18 is used to control the driver's seat side seat air-conditioning duct 13 in the same way as the sixth embodiment (D-seat seat air-conditioning adjustment). Due to this, cool air is blown from the driver's seat and cool air is below from the driver's seat side rear face vent.

According to the present embodiment, when the rear seats have no passengers, it is possible to stop the blowing of cool air to the rear seat side and supply all of the cool air which flows through the rear face duct 22 to the front seat side. For this reason, it is possible to improve the comfort of the front seats.

Other Embodiments

Note that, in the above embodiments, the case of application of the vehicular seat air-conditioning system of the present invention to the front seats was shown, but the invention is not limited to this. The present invention can be applied to all seats in a vehicle.

For example, when applying the vehicular seat air-conditioning system of the present invention to the rear seats, it is also possible to receive the supply of cool air from a rear seat-use cooler (rear cooler).

Further, in the above embodiments, the cool air sucked into the intake duct 12 is designed to be blown out from the seat top 1a of a seat 1, but it is also possible to blow out cool air sucked in at the intake duct 12 from the seatback part 1b of a seat 1.

The invention claimed is:

1. A vehicular seat air-conditioning system which blows out from a seat cool air which is supplied from an in-door air-conditioning unit which air-conditions a cabin space, said vehicular seat air-conditioning system comprising:
   a blower which generates blown air,
   a flexible bellows forming an intake duct which is connected to an intake side of the blower;
   a seat air-conditioning duct which is connected to the in-door air-conditioning unit and in which cool air which was cooled by the in-door air-conditioning unit flows; and
   a box-shaped part which is formed by a separate member from chassis members forming the cabin space and which is connected to a downstream side end of the seat air-conditioning duct,
   the box-shaped part having side walls which extend in a vertical direction and a bottom which closes a space surrounded by the side walls from the lower side,
   the top ends of the side walls forming an opening part which opens facing the upper side in the vertical direction, and
   an upstream side end of the intake duct being inserted into the inside of the box-shaped part through the opening part without being fitted and fixedly connected to the box-shaped part of the seat air conditioning duct so that the insertion of the intake duct into the inside of the box-shaped part is maintained within an adjustable range of the position of the seat in a longitudinal direction, wherein the upstream side end of the intake duct is located closer to the bottom of the box-shaped part than the opening part of the box-shaped part.

2. A vehicular seat air-conditioning system as set forth in claim 1, wherein said box-shaped part has projections which project out from the tops of said side walls toward the inside of said opening part.

3. A vehicular seat air-conditioning system as set forth in claim 1, wherein
said seat is a front seat,
said in-door air-conditioning unit is arranged at a front most part in the cabin, and
said seat air-conditioning duct is connected to said in-door air-conditioning unit through a rear seat use blowing duct which extends from said in-door air-conditioning unit toward the rear seats.

4. A vehicular seat air-conditioning system as set forth in claim 3, wherein
said rear seat use blowing duct is arranged between a driver's seat and a front passenger's seat, and
said box-shaped part is arranged further toward a center in a vehicle width direction than a centerline of said seat in the vehicle width direction.

5. A vehicular seat air-conditioning system as set forth in claim 1, wherein said intake duct is fastened to a seat rail used for adjustment of said seat in a longitudinal direction position.

6. A vehicular seat air-conditioning system as set forth in claim 1, further comprising:
a temperature detecting means for detecting a temperature of cool air at least at one of said seat air-conditioning duct and said intake duct; and
a controlling means for controlling at least one of said blower in blower level and said seat air-conditioning duct in air flow rate based on detection results of said temperature detecting means.

7. A vehicular seat air-conditioning system as set forth in claim 1, further comprising an adjustment mechanism which adjusts said seat air-conditioning duct in air flow rate.

8. A vehicular seat air-conditioning system as set forth in claim 3, further comprising:
an opening/closing mechanism which opens and closes said seat air-conditioning duct and said rear seat use blowing duct;
a sitting detecting means for detecting passengers sitting at said rear seats; and
a controlling means for controlling said opening/closing mechanism based on detection results of said sitting detecting means,
said controlling means controlling said opening/closing mechanism so that said seat air-conditioning duct is opened and said rear seat use blowing duct is closed when said sitting detecting means detects there are no passengers at said rear seats.

9. A vehicular seat air-conditioning system which blows out from a seat cool air which is supplied from an in-door air-conditioning unit which air-conditions a cabin space, said vehicular seat air-conditioning system comprising:
a blower which generates blown air;
a flexible bellows forming an intake duct which is connected to an intake side of the blower; and
a seat air-conditioning duct which is connected to the in-door air-conditioning unit and in which cool air which was cooled by the in-door air-conditioning unit flows,
a downstream side end of said seat air-conditioning duct being formed with a box-shaped part in which cool air from said in-door air-conditioning unit is filled,
said box-shaped part being formed with an opening part which opens facing the upper side in the vertical direction,
an upstream side end of the intake duct being inserted into the inside of the box-shaped part through the opening part without being fitted and fixedly connected to the box-shaped part of the seat air conditioning duct so that the insertion of the intake duct into the inside of the box-shaped part is maintained within an adjustable range of the position of the seat in a longitudinal direction,
said blower sucking in and blowing out cool air which filled said box-shaped part through said intake duct, and
said upstream side end of said intake duct is located closer to said bottom of said box-shaped part than said opening part of said box-shaped part.

10. A vehicular seat air-conditioning system as set forth in claim 1, wherein the upstream side end of the intake duct is located in a lower portion of the inside of the box shaped part.

11. A vehicular seat air-conditioning system as set forth in claim 1, wherein a gap is defined between an edge of the opening part of the box-shaped part and the intake duct.

12. A vehicular seat air-conditioning system as set forth in claim 1, wherein the only air that is supplied to the intake of the blower is supplied through the intake duct.

13. A vehicular seat air-conditioning system as set forth in claim 9, wherein the upstream side end of the intake duct is located in a lower portion of the inside of the box shaped part.

14. A vehicular seat air-conditioning system as set forth in claim 9, wherein a gap is defined between an edge of the opening part of the box-shaped part and the intake duct.

15. A vehicular seat air-conditioning system as set forth in claim 9, wherein the only air that is supplied to the intake of the blower is supplied through the intake duct.

16. A vehicular seat air-conditioning system as set forth in claim 1, wherein the flexible bellows forming the intake duct flexes to form a non-linear flow path through the intake duct leading to the intake side of the blower during adjustment of the seat within the adjustable range of the position of the seat.

17. A vehicular seat air-conditioning system as set forth in claim 1, wherein the flexible bellows accommodates a change in overall length of the intake duct.

18. A vehicular seat air-conditioning system as set forth in claim 9, wherein the flexible bellows forming the intake duct flexes to form a non-linear flow path through the intake duct leading to the intake side of the blower during adjustment of the seat within the adjustable range of the position of the seat.

19. A vehicular seat air-conditioning system as set forth in claim 9, wherein the flexible bellows accommodates a change in overall length of the intake duct.

\* \* \* \* \*